(12) United States Patent
Mondello et al.

(10) Patent No.: US 11,868,488 B2
(45) Date of Patent: *Jan. 9, 2024

(54) MEMORY DEVICES WITH CRYPTOGRAPHIC COMPONENTS

(71) Applicant: Micron Technology, Inc., Boise, ID (US)

(72) Inventors: Antonino Mondello, Messina (IT); Carmelo Condemi, San Giovanni la Punta (IT); Francesco Tomaiuolo, Acireale (IT); Tommaso Zerilli, Mascalucia (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,680

(22) Filed: Nov. 28, 2022

(65) Prior Publication Data

US 2023/0086754 A1 Mar. 23, 2023

Related U.S. Application Data

(63) Continuation of application No. 16/255,142, filed on Jan. 23, 2019, now Pat. No. 11,514,174.

(51) Int. Cl.
*G06F 11/30* (2006.01)
*G06F 12/14* (2006.01)
(Continued)

(52) U.S. Cl.
CPC ........ *G06F 21/602* (2013.01); *G06F 11/1068* (2013.01); *G06F 21/64* (2013.01);
(Continued)

(58) Field of Classification Search
CPC ... G11C 29/52; G06F 11/1068; G06F 21/602; G06F 21/64; G06F 21/79; H03M 13/2906; H04L 9/3242; H04L 9/3278
See application file for complete search history.

(56) References Cited

U.S. PATENT DOCUMENTS 5,623,637 A 4/1997 Jones et al.
7,607,177 B2 10/2009 Estakhri et al.
(Continued)

FOREIGN PATENT DOCUMENTS

JP 2011-081776 A 4/2011
JP 2013-545340 A 4/2012
(Continued)

OTHER PUBLICATIONS

Office Action from related Taiwan patent application No. 108138758 dated Dec. 11, 2020, 15 page.
(Continued)

*Primary Examiner* — Samir W Rizk
(74) *Attorney, Agent, or Firm* — Brooks, Cameron & Huebsch, PLLC

(57) ABSTRACT

An apparatus, such as a memory system (e.g., a NAND memory system), can have a controller with a first error correction code component and a memory device (e.g., a NAND memory device) coupled to the controller. The memory device can have an array of memory cells, a second error correction code component coupled to the array and configured to correct data from the array, and a cryptographic component coupled to receive the corrected data from the second error correction code component.

20 Claims, 7 Drawing Sheets

(51) Int. Cl.
    *G06F 21/60*     (2013.01)
    *H04L 9/32*     (2006.01)
    *H03M 13/29*     (2006.01)
    *G06F 11/10*     (2006.01)
    *G11C 29/52*     (2006.01)
    *G06F 21/64*     (2013.01)
    *G06F 21/79*     (2013.01)

(52) U.S. Cl.
    CPC .............. *G06F 21/79* (2013.01); *G11C 29/52* (2013.01); *H03M 13/2906* (2013.01); *H04L 9/3242* (2013.01); *H04L 9/3278* (2013.01)

(56) References Cited

U.S. PATENT DOCUMENTS

| | | | |
|---|---|---|---|
| 8,930,714 | B2 | 1/2015 | Glew et al. |
| 11,514,174 | B2 * | 11/2022 | Mondello .............. G11C 29/52 |
| 2010/0262889 | A1 | 10/2010 | Bains |
| 2010/0313056 | A1 | 12/2010 | Margolis et al. |
| 2010/0313058 | A1 | 12/2010 | Margolis et al. |
| 2014/0136915 | A1 | 5/2014 | Hyde et al. |
| 2014/0223198 | A1 | 8/2014 | Saranghar et al. |
| 2015/0234751 | A1 | 8/2015 | Van Der Sluis et al. |
| 2016/0188502 | A1 | 6/2016 | Sinclair |
| 2017/0206134 | A1 | 7/2017 | Huang |
| 2018/0176012 | A1 | 6/2018 | Hung et al. |
| 2020/0104208 | A1 | 4/2020 | Heo et al. |

FOREIGN PATENT DOCUMENTS

| | | |
|---|---|---|
| JP | 2012-252557 A | 12/2012 |
| JP | 2014-191372 A | 10/2014 |
| KR | 1020070061021 A | 6/2007 |
| TW | 201319817 A | 5/2013 |
| TW | 201805817 A | 8/2015 |

OTHER PUBLICATIONS

International Search Report and Written Opinion from related international application No. PCT/US2019/058812, dated Feb. 21, 2020, 12 pages.

* cited by examiner

MEMORY DEVICES WITH CRYPTOGRAPHIC COMPONENTS

PRIORITY INFORMATION

This application is a Continuation of U.S. application Ser. No. 16/255,142 filed on Jan. 23, 2019, the contents of which are incorporated herein by reference.

TECHNICAL FIELD

The present disclosure relates generally to memory devices, and more particularly, to memory devices with cryptographic components.

BACKGROUND

Memory systems may be implemented in electronic systems, such as computers, cell phones, hand-held electronic devices, etc. Some memory systems, such as solid-state drives (SSDs), embedded Multi-Media Controller (eMMC) devices, Universal Flash Storage (UFS) devices, and the like, may include non-volatile storage memories for storing host (e.g., user) data from a host. Non-volatile storage memories provide persistent data by retaining stored data when not powered and may include NAND flash memory, NOR flash memory, read only memory (ROM), Electrically Erasable Programmable ROM (EEPROM), Erasable Programmable ROM (EPROM), and resistance variable memory, such as phase change random access memory (PCRAM), three-dimensional cross-point memory (e.g., 3D XPoint), resistive random access memory (RRAM), ferroelectric random access memory (FeRAM), magnetoresistive random access memory (MRAM), and programmable conductive memory, among other types of memory.

In some examples, memory devices can store secure information and can be susceptible to malicious attacks aimed at obtaining and/or altering the secure information. Such attacks can include replay attacks, for example, which can involve the malicious or fraudulent repeat or delay of secure information and can involve intercepting and retransmitting the secure information.

DETAILED DESCRIPTION

An example apparatus, such as a memory system (e.g., a NAND memory system), can have a controller with a first error correction code component and a memory device (e.g., a NAND memory device) coupled to the controller. The memory device can have an array of memory cells, a second error correction code component coupled to the array and configured to correct data from the array, and a cryptographic component coupled to receive the corrected data from the second error correction code component.

Having the cryptographic component on the memory device allows the memory device, via the cryptographic component, to perform cryptographic operations on data stored in the memory array (e.g., to determine whether data stored in the memory array is secure) without sending the data to a controller that is external to the memory device, as is commonly done in previous approaches.

For example, in some previous approaches, the cryptographic component can be in the external controller, and data may be sent from the memory device to the external controller to determine whether the data is secure. However, sending the data to the external controller can be an insecure process, and the security of the data that is sent to the external controller can be compromised. Sending the data to the external controller can also be time consuming. Moreover, security provided via an external controller can be costly since it may involve paying fees to third parties providing the security functions. As such, having the cryptographic component on the memory device can improve security and can reduce the time and cost involved in performing cryptographic operations as compared to having the cryptographic component in an external controller.

Some memory devices, such as NAND memory devices, can have relatively high bit error rates (BERs) when user data is read from the memory array. As a result, problems can occur when performing cryptographic operations on user data with such high BERs. Error correction schemes may be employed to correct data read from a memory array. However, in previous approaches, the data error correction operations may be performed by the external controller on user data that is sent from the memory device to the external controller. This means that, in some examples, the data might be sent to the external controller for correction and the corrected data sent back to the memory device for cryptographic operations. However, sending the data back and forth between the memory device and the external controller can be an insecure and a time-consuming process. The disclosed embodiments solve these problems by locating an error correction component on the memory device and using that error correction component to correct data from the array for use by the cryptographic component of the memory device.

Figure 1:
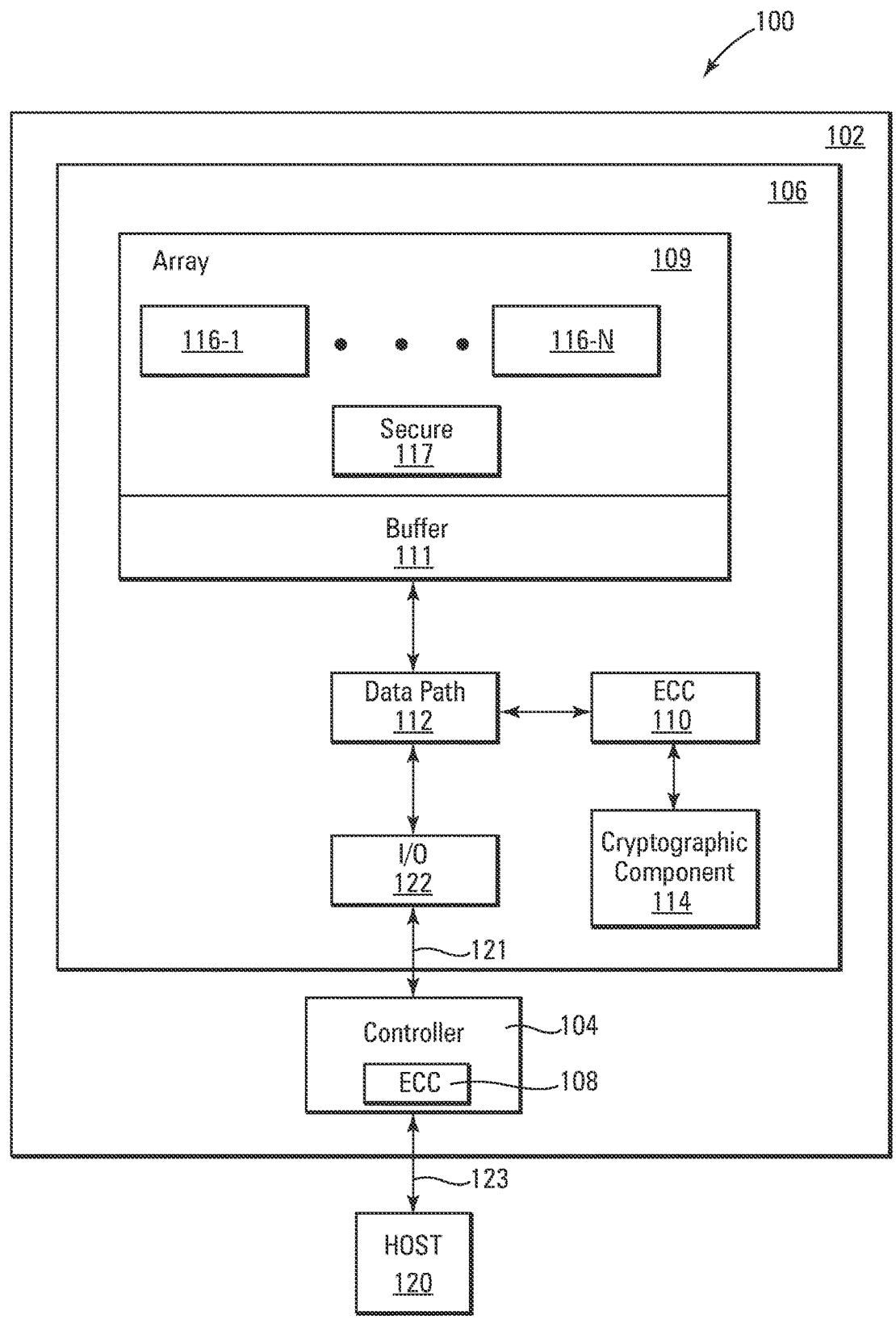
FIG. 1 is a simplified block diagram of an apparatus in accordance with a number of embodiments of the present disclosure.

FIG. 1 is a simplified block diagram of an apparatus in the form of a computing system 100 in accordance with a number of embodiments of the present disclosure. Computing system 100 includes an apparatus in the form of memory system 102 that can be, for example, a storage system such as an SSD, a UFS device, an eMMC device, etc. In some examples, memory system 102 can be a NAND memory system. However, the disclosed embodiments are not limited to a particular type of memory system. For example, memory system 102 could serve as main memory for system 100.

As shown in FIG. 1, memory system 102 can include a controller 104 that may be referred to as a memory system controller (e.g., a NAND controller), in that controller 104 can control a memory device 106 (e.g., a NAND memory device) coupled to controller 104. Controller 104 can be external to memory device 106, and therefore, can be referred to as an external controller, such as an external host controller. In some examples, controller 104 and memory device 106 can be integrated on a single chip.

Controller 104 has an error correction component 108 (e.g., an external error correction component). Memory device 106 has a memory array (e.g. a NAND memory array) 109 coupled to an error correction component 110 (e.g., an internal error correction component) that can correct data from array 109. For example, array 109 can be coupled to a buffer 111 (e.g., a data buffer) that can be a page buffer. Buffer 111 can be coupled to a data path 112 that can be coupled to error correction component 110. A cryptographic component 114 can be coupled to receive the corrected data from error correction component 110. As discussed further herein, cryptographic component 114 can perform cryptographic operations on the corrected data, such as to determine whether the data is secure. In some examples, the cryptographic operations can include calculating cryptographic codes, such as cryptographic hashes, message authentication codes (MACs), hash MACS (HMACS), among others.

Array 109 can be laid out logically into logical partitions 116-1 to 116-N and a secure logical partition 117. For example, the logical partitions can include a number of physical blocks of memory cells each configured to be erased together as a group. Secure partition 117 can be accessed by secure commands issued by a host 120 that is coupled to controller 104. Logical partitions 116-1 to 116-N can be non-secure partitions that can be accessed by non-secure commands from host 120.

In some examples, the memory cells corresponding to the logical partitions 116-1 to 116-N can be programmed to store a single bit per cell or multiple bits per cell, such as two bits per cell, three bits per cell, four bits per cell, and so on. However, in a number of embodiments, the memory cells corresponding to secure logical partition 117 may be programmed to store only a single bit per cell in order to ensure a relatively low BER as compared to multibit cells. Memory cells configured to store a single bit per cell can be referred to as single-level cells (SLCs), and memory cells configured to store multiple bits per cell can be referred to as multilevel cells (MLCs).

A memory cell can be programmed to one of $2^m$ data states, with m being the number of bits per cell. Each data state can correspond to a different threshold voltage Vt distribution, and the memory cell can be programmed to a Vt that can correspond to one of the Vt distributions. For example, for two bits per cell, a memory cell can be programmed to a Vt corresponding to one of four data states 11, 10, 01, and 00, and for one bit per cell, a memory cell can be programmed to a Vt corresponding to one of two data states 0 and 1.

Secure commands can refer to commands received from host 120, via controller 104, that require authentication, for example. Secure commands may refer to commands directed to addresses corresponding to the secure partition 117 as opposed commands directed to addresses corresponding to non-secure partitions 116. As discussed further herein, a secure command can include an operation code, a cryptographic signature, and a freshness indicator. In contrast, non-secure commands might not require authentication, and thus might not include a signature or a freshness indicator.

Memory device 106 can be coupled to controller 104 via an interface 121 (e.g., memory interface). For example, interface 121 can couple controller 104 to an input/output (I/O) 122 of memory device 106. I/O 122 can, in turn, be coupled to data path 112. In some examples, interface 121 can include a data bus that can support various standards and/or comply with various interface types, such as double data rate (DDR), Open NAND Flash Interface (ONFI), Serial Peripheral Interface (SPI), etc.

Controller 104 can receive secure and non-secure commands, such as secure and non-secure read and write commands from host 120. Controller 104 can, for example, receive user data to be written to memory array 109 from a host 120 (e.g., via a host interface 123). For example, controller 104 can map secure data to secure logical partition 117 and non-secure data to logical partitions 116-1 to 116-N.

Host 120 can be, for example, a host system, such as a personal laptop computer, a desktop computer, a digital camera, a mobile device (e.g., cellular phone), network server, Internet of Things (IoT) enabled device, or a memory card reader, among various other types of hosts. For instance, host 120 can include one or more processors capable of accessing memory system 102 (e.g., via controller 104) over interface 123 that can include a bus. Interface 123 may be a standardized interface, such as a serial advanced technology attachment (SATA), peripheral component interconnect express (PCIe), or a universal serial bus (USB), among various others.

Figure 2A:
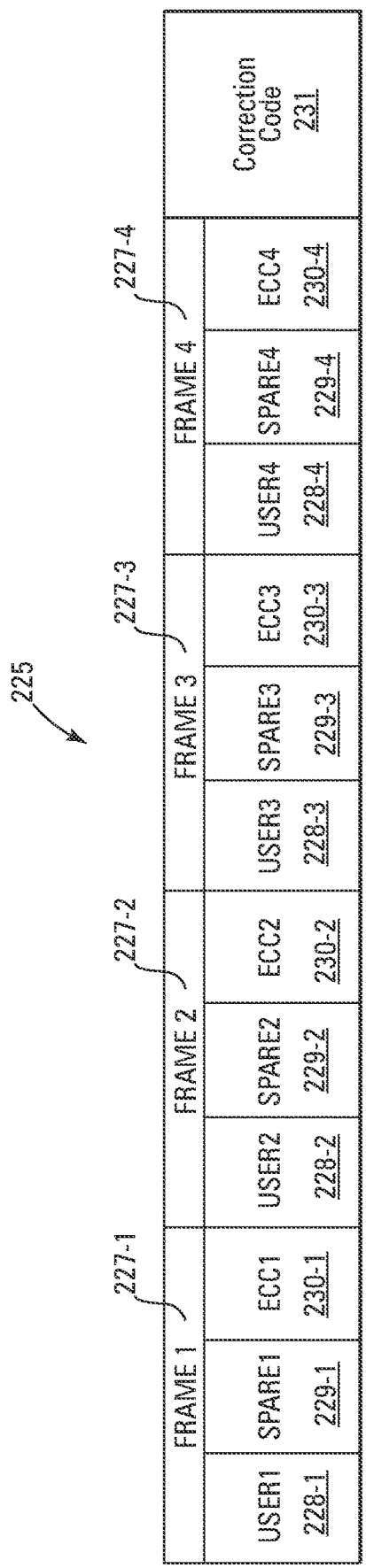
FIG. 2A illustrates a data structure in accordance with a number of embodiments of the present disclosure.

FIG. 2A illustrates a data structure 225 (e.g., a managed unit) in accordance with a number of embodiments of the present disclosure. Controller 104 can send data structure 225 to memory device 106 during a write (programming) operation that writes data structure 225 to array 109. In some examples, data structure 225 can be referred to as a codeword. Data structure 225 can correspond to a page of data in a block of memory cells, for example.

Data structure 225 can include segments 227-1 to 227-4 of data that can be respectively Frame 1 to Frame 4. However, the disclosure is not so limited, and there can be any number of segments in data structure 225. In some examples, the respective segments 227-1 to 227-4 can be referred to as respective sub-codewords.

The segments 227-1 to 227-4 can respectively include user data fields 228-1 to 228-4, spare data fields 229-1 to 229-4 that can respectively store spare data SPARE1 to SPARE4, and error correction code (ECC) fields 230-1 to 230-4 that can respectively store ECC data ECC1 to ECC4. In some examples, each of the user data fields 228-1 to 228-4 can store four kilobytes of user data; each of the spare data fields 229-1 to 229-4 can store 16 bytes of spare data; and each of the error correction code fields 230-1 to 230-4 can store 516 bytes of ECC data. However, the disclosure is not so limited.

Controller 104 can respectively put user data USER1 to USER4 from host 120 in user data fields 228-1 to 228-4. ECC component 108 can calculate ECC data ECC1 to ECC4 respectively from user data USER1 to USER4, and controller 104 can respectively put the ECC data ECC1 to ECC4 in user data fields 228-1 to 228-4. For example, the ECC data ECC1 to ECC4 respectively corresponds to user data USER1 to USER4.

Data structure 225 can include a correction code 231, such as a Bose-Chaudhuri-Hocquenghem (BCH) code, that can be used to correct the whole data structure 225. For example, ECC1 to ECC4 can be referred to as inner correction codes, and correction code 231 can be referred to as an outer correction code. In some examples, correction code 231 can be used when one or more of ECC1 to ECC4 fails to correct its corresponding user data. The correction code 231 can be 80 bytes in some examples, but the disclosure is not so limited.

When data structure 225 is non-secure and the user data USER1 to USER4 is non-secure data, controller 104 can use spare data fields 229-1 to 229-4 for various purposes. For example, controller 104 can program various patterns of spare data SPARE1 to SPARE4 respectively in spare data fields 229-1 to 229-4. Controller 104 can send the non-secure data structure 225 to buffer 111, and the non-secure data structure 225 in buffer 111 can be written to a non-secure partition 116. For example, the non-secure data structure 225 can be written in a group (e.g., a page) of SLCs or MLCs in a non-secure partition 116.

When the user data USER1 to USER4 is secure data, controller 104 might not use the spare data fields 229-1 to 229-4. For example. controller 104 may write the spare data SPARE1 to SPARE4 as patterns of all ones or all zeros in the spare data fields 229-1 to 229-4. Controller 104 can then send the secure data structure to data buffer 111.

In some examples, the secure user data USER1 to USER4 can also be sent to ECC component 110, and ECC component 110 can calculate ECC data from user data USER1 to USER4. The ECC data calculated from user data USER1 to USER4 by ECC component 110 can be respectively stored in the spare data fields 229-1 to 229-4 while data structure 225 is in buffer 111. For example, the spare data SPARE1 to SPARE4 can be respectively the ECC calculated from user data USER1 to USER4. In some examples, the patterns of all ones or zeros of the respective spare data SPARE1 to SPARE4 can be overwritten with the respective ECC calculated from user data USER1 to USER4.

Figure 2B:
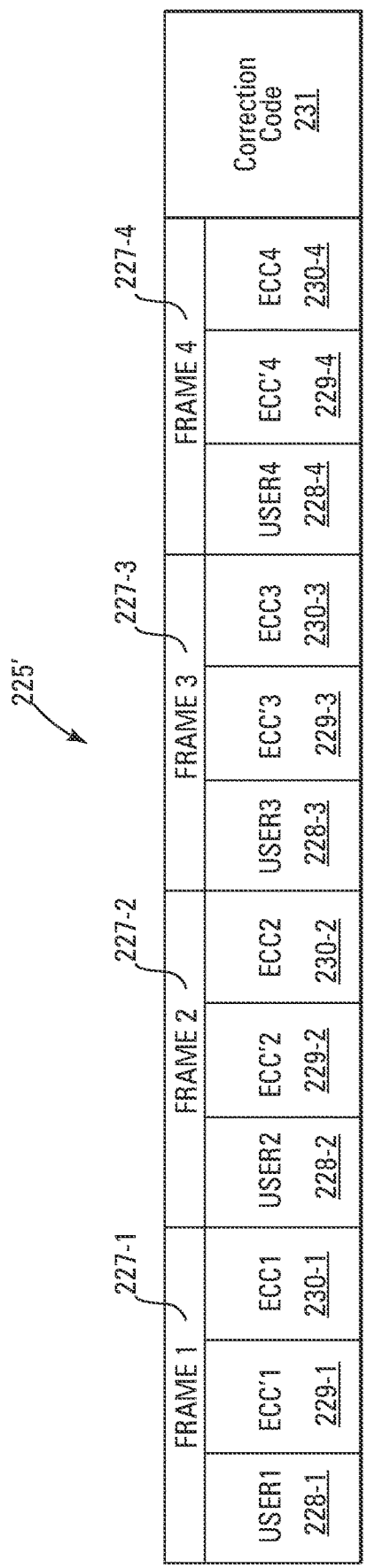
FIG. 2B illustrates a data structure with ECC data calculated by a memory device in accordance with a number of embodiments of the present disclosure.

FIG. 2B illustrates a data structure 225' with secure user data and ECC data calculated by memory device 106 in accordance with a number of embodiments of the present disclosure. In FIG. 2B, the ECC data ECC'1 to ECC'4 is respectively calculated from user data USER1 to USER4 by ECC component 110 and is respectively stored in spare data fields 229-1 to 229-4. For example, the patterns of all ones or zeros of the respective spare data SPARE1 to SPARE4 can be overwritten with the respective ECC data ECC'1 to ECC'4. The secure data structure 225' can be in buffer 111 and can be written in secure partition 117. For example, the secure data structure 225' in FIG. 2B can be programmed only in a group of SLCs in secure partition 117.

ECC component 110 can be referred to as a "light ECC" component, for example, because it may use fewer ECC bits than ECC component 108. For example, the ECC' data can be referred to as light ECC data. In some examples, ECC' can be eight-bit ECC and can recover a BER of about $10^{-8}$ to a final target BER of about $10^{-15}$. For example, the light ECC can be sufficient due to the lower BERs associated with the SLCs that store the secure user data in partition 117. ECC component 108 can be a heavier ECC component that ECC component 110 because ECC component 108 can be used to correct user data from the MLCs in partitions 116. Note that MLCs can have higher BERs that SLCs.

In some examples, the secure data structure 225' depicted in FIG. 2B can be read from secure partition 117 to buffer 111. The user data USER1 to USER4 can be corrected by ECC component 110 respectively using the ECC data ECC'1 to ECC'4. Cryptographic component 114 can then compute respective cryptographic codes from the respective corrected user data USER1 to USER4.

Figure 3A:
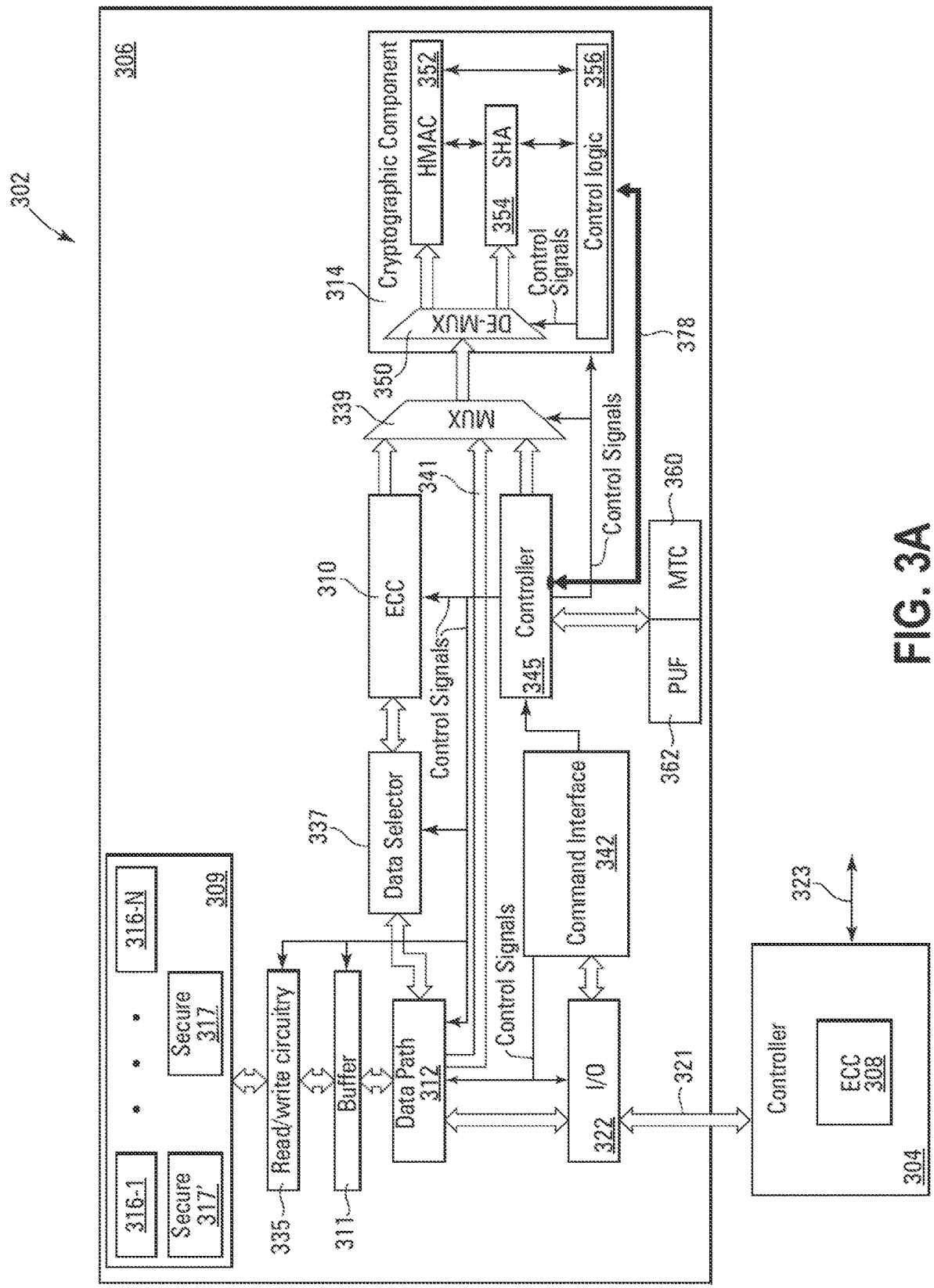
FIG. 3A is a block diagram of an apparatus (e.g., in the form of a memory system) in accordance with a number of embodiments of the present disclosure.

FIG. 3A is a detailed block diagram of an apparatus in the form of a memory system 302 that can be memory system 102 in accordance with a number of embodiments of the present disclosure. The figures herein follow a numbering convention in which the first digit or digits correspond to the drawing figure number and the remaining digits identify an element or component in the drawing. Similar elements or components between different figures may be identified by the use of similar digits. For example, in the number 117, the digit 1 refers to FIG. 1, and the digits 17 identify the secure partition in FIG. 1. Similarly, in the number 317, the digit 3 refers to FIGS. 3A and 3B, and the digits 17 identify a similar secure partition in FIGS. 3A and 3B.

Memory system 302 can include a memory device 306 coupled to a controller 304 by an interface 321. For example, controller 304 can be coupled to I/O 322 by interface 321. Controller 304 can be controller 104 and can include an ECC component 308 that can be ECC component 108. Controller 304 can be coupled to a host, such as host 120, by a host interface 323. I/O 322 can be coupled to a data path 312. Data path 312 can be coupled to a buffer 311 that can be coupled to read/write circuitry 335 and that can be buffer 111.

Read/write circuitry 335 can be coupled to a memory array 309. Portions (e.g., blocks or groups of blocks) of array 309 can correspond to non-secure logical partitions 316-1 to 316-N and secure logical partitions 317 and 317'.

Figure 3B:
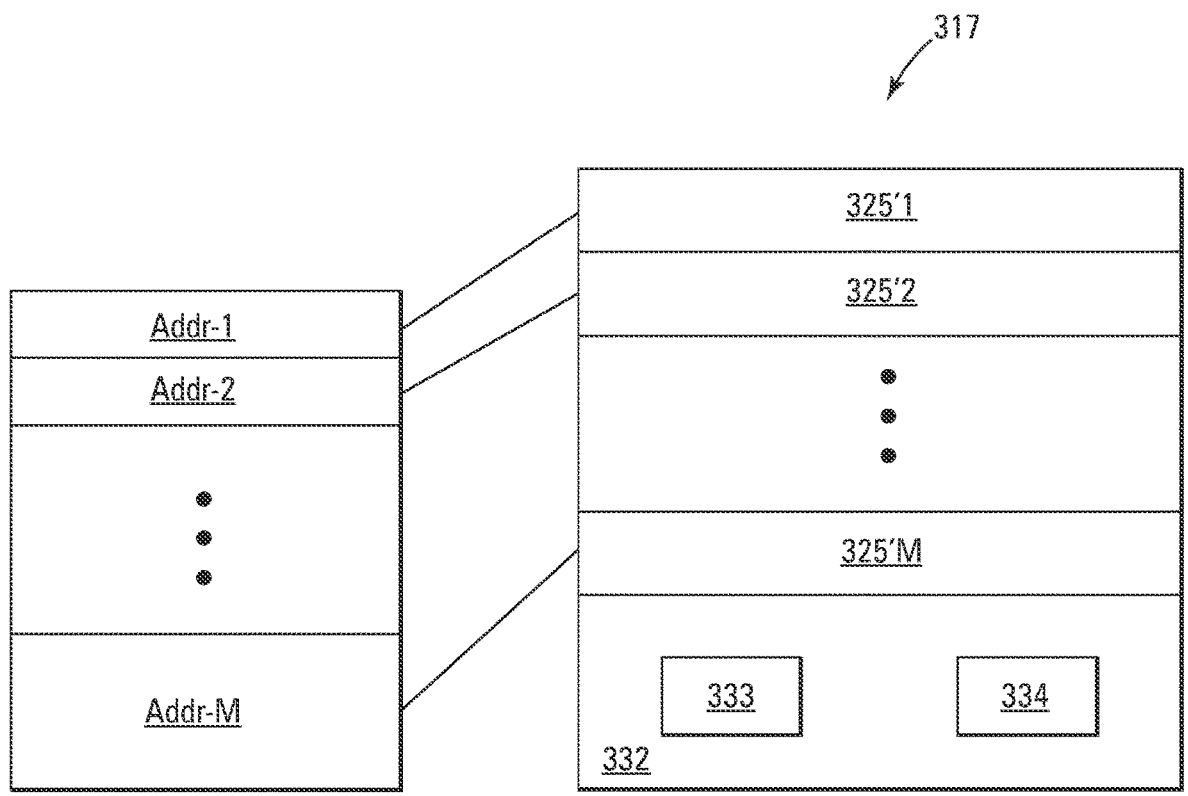
FIG. 3B illustrates a secure memory partition in accordance with a number of embodiments of the present disclosure.

FIG. 3B illustrates secure partition 317 in accordance with a number of embodiments of the present disclosure. Secure partition 317 can store a number of data structures 325' (e.g., 325'-1 to 325'-M). Each of the data structures 325'-1 to 325'-M can be configured as secure data structure 225', for example. Data structures 325'-1 to 325'-M can respectively be addressed by addresses (e.g., page addresses) Addr-1 to Addr-M.

Secure partition 317 can include a secret region 332 that can be inaccessible to the user. For example, secret region 332 can lie outside of the address space accessible to the user. A secret key (e.g., a root key) 333 can be stored in secret region 332. In some examples, secret key 333 can be stored in secret region 332 at the manufacturing facility before memory system 302 is released to the user (e.g., consumer). Alternatively, secret key 333 can be generated by memory device 306, as discussed further herein.

A cryptographic code, such as a golden measure 334, can be stored in secret region 332. For example, golden measure 334 can be calculated for secure partition 317 the first time the data is stored in the secure partition 317 before any operations, such as read, write, or erase operations, have been performed. Golden measure 334 can be left unaltered for the lifetime of memory device 306, for example. Golden measure 334 can correspond to the user data stored in data structures 325'-1 to 325'-M. Golden measure 334 can be compared to a cryptographic measure calculated by memory device 306 from the user data stored in data structures 325'-1 to 325'-M to determine whether the user data is secure, as discussed further herein.

In some examples, secure partition 317 can be a secure sub-partition of several of such sub-partitions that can make up a larger secure partition. In such examples, each sub-partition can be addressed by a respective sub-partition address. Each respective sub-partition can, for example, have a respective number of data structures 325' and a respective golden measure 334 corresponding to the user data in the respective number of data structures. However, the secret key 333 can be for the partition as a whole. For example, secret key 333 can be used in cryptographic operations performed on the various sub-partitions Partition 317' can store the same data as secure partition 317. Partition 317' can be a backup partition to partition 317 that can be swapped with partition 317 during a remediation process, as discussed further herein. For example, the data in partitions 317 and 317' can be the same when the data is first stored partitions 317 and 317'. However, the data in partition 317' can be left unaltered (e.g., never updated) so that the data remains in its initial state. For example, no operations, such as read, write, or erase operations, may be performed on the data after the data is stored in partition 317'. Alternatively, the data in partitions 317 and 317' can be updated together to have the same patterns. In some examples, partition 317' can be a secret partition that can be hidden from the user such that partition 317' is inaccessible to the user.

Read/write circuitry 335 can write secure data, such as secure data structure 225' from buffer 311 into secure partition 317. Read/write circuitry 335 can read the secure data from secure partition 317 into buffer 311.

In some examples, non-secure data, such as a non-secure data structure in the format data structure 225 with non-secure user data, can be sent from controller 304 to buffer 311 via interface 321, I/O 322, and data path 312 during a non-secure write operation, and read/write circuitry 335 can write the non-secure data into a partition 316.

Read/write circuitry 335 can read the non-secure data structure from a non-secure logical partition 316 into buffer 311 during a non-secure read operation. The read non-secure data can be sent to controller 304 and the user data can be corrected by ECC component 308.

A data selector 337 of memory device 306 can be coupled to data path 312. Data selector 337 can be coupled to an ECC component 310 (e.g., a light ECC component) that can be ECC component 110. ECC component 310 can be coupled to an input of a multiplexer 339. Data path 312 can be directly coupled (e.g., with no intervening components) to another input of multiplexer 339 by a data bus 341.

I/O 322 can be coupled to a command interface 342 (e.g., a command user interface). Command interface 342 can be coupled to a controller 345 of memory device 306. Controller 345 can be coupled to another input of multiplexer 339.

Controller 345 can be referred to as an internal controller because it is internal to memory device 306, as opposed to controller 304 being an external controller because controller 304 is external to memory device 306. In some examples, controller 304 can be a memory system controller because it can control memory device 306, and controller 345 can be referred to as an embedded controller.

Controller 345 can send respective control signals to ECC component 310, data selector 337, data path 312, buffer 311, and read/write circuitry 335. For example, the respective control signals can activate ECC component 310, data selector 337, data path 312, buffer 311, and read/write circuitry 335. Controller 345 can send respective control signals to multiplexer 339. Each respective signal can cause multiplexer 339 to select a respective input.

An output of multiplexer 339 can be coupled to an input of a demultiplexer 350 that can, for example, be part of a cryptographic component 314 that can be cryptographic component 114. Cryptographic component 314 can include a message authentication code (MAC) component, such as an HMAC component 352. Cryptographic component 314 can also include a cryptographic hash component, such as a SHA component 354, coupled to HMAC component 352. For example, SHA component 354 can implement a SHA-256 HASH algorithm. Respective outputs of demultiplexer 350 can be respectively coupled to SHA component 354 and HMAC component 352.

Cryptographic component 314 can include control logic 356 coupled to HMAC component 352 and SHA component 354. Control logic 356 can be coupled to receive control signals from controller 345 that can activate control logic 356. Control logic 356 can output control signals to demultiplexer 350. For example, a control signal can cause demultiplexer 350 to select the output coupled to HMAC component 352, and another control signal can cause demultiplexer 350 to select the output coupled to SHA component 354. In some examples, control logic 365 can send various results and/or flags to controller 345 and/or command interface 342 related to the operations performed by cryptographic component 314.

Memory device 306 can include a monotonic counter 360 coupled to controller 345 and a physical unclonable function (PUF) component 362 coupled to controller 345. Monotonic counter 360 can increment a monotonically increasing count (MTC) each time a secure command is received by memory device 306 from controller 304. In some examples, monotonic counter 360 can increment the MTC for each power cycle of reset of memory device 306. The MTC can be a freshness indicator that can be compared to a corresponding freshness indicator embedded in the secure command to determine the freshness of the secure command. This can guard against (e.g., eliminate) the possibility of replay.

A PUF can be based on physical phenomena and/or physical characteristics of memory device 306, such as temperature, noise, signal speed, structural characteristics, etc. PUF component 362 can generate random numbers, for example. In some examples, a PUF generated by PUF component 362 can be used to generate a secret key, such as secret key 333, that can be used by HMAC component 352 for cryptographic operations.

The secret key can be a PUF, for example. In some examples, controller 345 can send a PUF and an MTC to SHA component 354 via multiplexer 339 and demultiplexer 350, so SHA component 354 can generate the secret key by hashing the PUF with the MTC (e.g., secret key=HASH (PUF|MTC)). Alternatively, controller 345 can send a PUF, MTC, and data from controller 304 to SHA component 354, so SHA component 354 can generate the secret key by hashing the PUF with the MTC and the data (e.g., secret key=HASH(PUF|MTC|data)).

I/O 322 can route commands from controller 304 to command interface 342 according to a specific protocol, such as an SPI protocol or an ONFI protocol, among other protocols. Command interface 342 can receive a non-secure command and can evaluate the command to determine whether the command is correct. For example, command interface 342 can determine whether the command is correct by determining whether the command includes the expected operation code and the expected command parameters. In response to determining that the command is correct, command interface 342 can send a control signal to activate data path 312 and I/O 322 to route data. Command interface 342 can also activate controller 345 for executing the command.

In the case, of a non-secure write command, activating data path 312 and I/O 322 routes data, corresponding to the non-secure write command, from controller 304 to buffer 311 via I/O 322 and data path 312. In the case, of a non-secure read command, activating data path 312 and I/O 322 routes data, corresponding to the non-secure read command, from buffer 311 to controller 304 via data path 312 and I/O 322.

Figure 4:
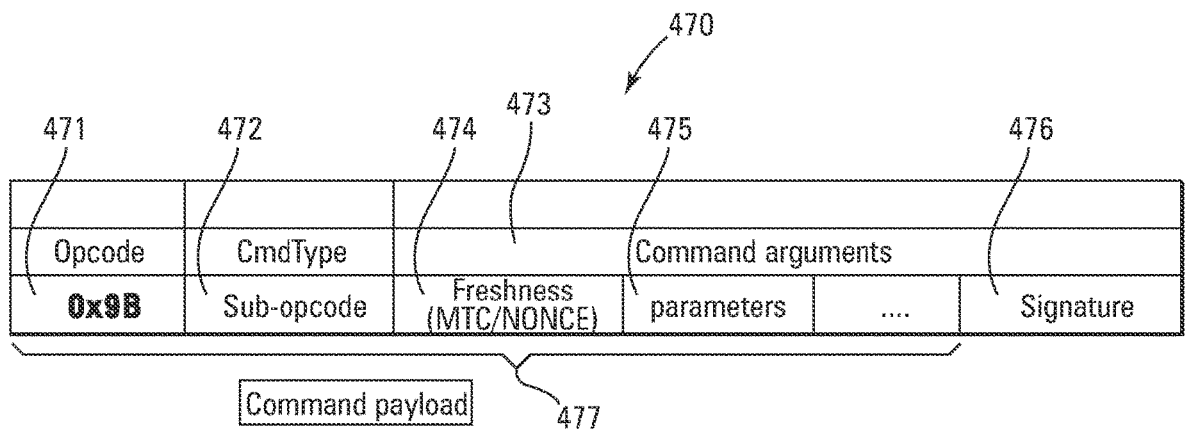
FIG. 4 illustrates a secure command in accordance with a number of embodiments of the present disclosure.

FIG. 4 illustrates a secure command 470 in accordance with a number of embodiments of the present disclosure. Command 470 can include an operation code (Opcode) field 471 that can store an Opcode (e.g., hexadecimal code 0x9B). Command 470 can include a command type (CmdType) field 472 that can store a Sub-opcode as a command type. Command 470 can include a command arguments field 473 that can include a freshness field 474 that can store a freshness of the command, such as an MTC or a NONCE (e.g., an arbitrary number that is used only once). Command arguments field 473 can also include a command parameter field 475 that can store parameters of the command and a command signature field that can store a signature of the command. A command payload 477 can include the Opcode, Sub-opcode, freshness, and the parameters, for example.

Command interface 342 can receive secure command 470 from controller 304. Command interface 342 can activate controller 345 in response to determining that the Opcode is correct. Controller 345 can then authenticate command 470. For example, controller 345 can determine whether the Sub-opcode, the number of bytes in payload 477, and the freshness are correct. If any of these is incorrect, controller 345 can abort the command and send an error message to controller 304 through command interface 342 and I/O 322. Note that controller 345 can determine the freshness by comparing the MTC in command 470 to the MTC from monotonic counter 360, for example. In response to the Sub-opcode, the number of bytes in payload 477, and the freshness being correct, controller can verify the signature in command 470.

In some examples, controller 345 can verify the signature by comparing the signature to a local cryptographic signature calculated by cryptographic component 314. For example, cryptographic component 314 can calculate the local signature as a MAC of payload 477 and a secret key K, such as secret key 333. Payload 477 can be sent from controller 345 to cryptographic component 314 via multiplexer 339 and demultiplexer 350, for example.

Cryptographic component 314 can send the local signature to controller 345 via a bus 378. Controller 345 can execute command 470 in response to the signature in command 470 matching the local signature or abort command 470 in response to the signature in the command 470 not matching the local signature.

In some examples, the local signature can be an HMAC calculated by HMAC component 352 from the payload 477 and the secret key K (e.g., as HMAC(payload, K)). For example, controller 345 can send a control signal to control logic 356, requesting an HMAC calculation. Controller 345 can also send a control signal to multiplexer 339 that causes multiplexer 339 to select the input from controller 345 for output from multiplexer 339 so that multiplexer 339 can output payload 477 to demultiplexer 350. Control logic 356 can send a control signal to demultiplexer 350 that causes demultiplexer 350 to direct payload 477 to HMAC component 352. Controller 345 can send a control signal to control logic 356, and control logic 356 can cause HMAC component 352 to calculate the local signature in response to control logic 356 receiving the control signal. Control logic 356 can send the local signature to controller 345 over bus 378.

In some examples, the local signature can be calculated by using HMAC component 352 in conjunction with SHA component 354. For example, HMAC component 352 can combine the secret key K with inner padding (ipad), such as by XORing K and ipad (e.g., K XOR ipad). HMAC component 352 can combine the result of the XORing with the payload to produce (K XOR ipad)||payload. SHA component 354 can then calculate a cryptographic HASH of (K XOR ipad)||payload as HASH[(K XOR ipad)||payload]. HMAC component 352 can then XOR K with an outer padding (opad) and combine the result of that XOR with HASH[(K XOR ipad)||payload] to produce (K XOR opad)||HASH[(K XOR ipad)||payload]. SHA component 354 can then calculate the cryptographic HASH of (K XOR opad)||HASH[(K XOR ipad)||payload] as HASH[(K XOR opad)||HASH[(K XOR ipad)||payload]] that can be the local signature. Note that SHA component 354 is used twice in this example.

In some examples, cryptographic operations can be performed on non-secure user data from controller 304 by cryptographic component 314 in response to commands from controller 304. For example, cryptographic component 314 can compute a MAC of the user data and a key received from controller 304 (e.g., MAC(user data, key)) in response to a MAC command from controller 304 or a HASH of the user data received from controller 304 in response to a HASH command from controller 304. The computed MAC or HASH can then be returned to controller 304.

In some examples, the command (e.g., the MAC or HASH command) can be received at command interface 342 from controller 304, and command interface 342 can activate controller 345. Controller 345 can activate, via control signals, I/O 322 and data path 312 so that a data structure, such as data structure 225, corresponding to the command can be sent from controller 304 to buffer 311 via I/O 322 and data path 312.

Controller 345 can activate, via control signals, buffer 311 and data path 312 so that the user data in the data structure in buffer 311 can be sent from buffer 311 to the input of multiplexer 339 coupled to data bus 341. Controller 345 can cause multiplexer 339 to select the user data for output to demultiplexer 350.

Controller 345 can activate control logic 356 (e.g., via a "handshake" operation between controller 354 and control logic 356). The activated control logic 356 can activate the HMAC component 352 and can cause demultiplexer 350 to direct the user data to HMAC component 352. In examples in which a controller 304 provides a key, the key can be sent to controller 345 with the command, and controller 345 can send the key to control logic 356 via bus 378.

When the user data in the data structure 225 in FIG. 2A is secure, data structure 225 can be written to data buffer 311 in response to a secure write command being authenticated, as described previously. For example, controller 345 can activate I/O 322 and data path 312 in response to authenticating the write command so that data structure 225 can be sent to data buffer 311 via I/O 322 and data path 312.

Controller 345 can activate, via control signals, buffer 311, data path 312, data selector 337, and ECC component 310. The respective frames, Frame 1 to Frame 4, of data structure 225 can then be sent to data selector 337 from buffer 311 so that data selector 337 can select the respective user data USER1 to USER4 and send the respective user data USER1 to USER4 to ECC component 310. ECC component 310 can calculate the respective ECC'1 to ECC'4 from the respective user data USER1 to USER4.

ECC component 310 can send the respective ECC'1 to ECC'4 back to buffer 311 so that the respective ECC'1 to ECC'4 can be written in the respective spare fields 229-1 to 229-4. For example, the respective spare data SPARE1 to SPARE4 (e.g., having data patterns of all ones or zeros) can be overwritten with the respective ECC'1 to ECC'4 (e.g., to produce data structure 225'). Data structure 225' can be written from buffer 311 into secure partition 317 by read/write circuitry 335 in response to controller 345 activating read/write circuitry 335 via a control signal.

A secure data structure, such as a secure data structure 225', can be read from partition 317 in response to a secure read command from controller 304 being authenticated, as described previously. Controller 345 can activate read/write circuitry 335 in response to authenticating the read command so that read/write circuitry 335 can read the data structure into data buffer 311.

Controller 345 can activate buffer 311, data path 312, and I/O 322 so that the data structure can be routed from buffer 311 to controller 304. In some examples, ECC component 308 can correct the user data, such as USER1, USER2, USER3, and USER4 (FIG. 2B), with respective ECC data, such as ECC1, ECC2, ECC3, and ECC4.

In some examples, memory device 306 can determine whether the user data in secure partition 317 is secure each time memory device 306 is powered up or reset. For example, controller 304 can send a secure command to memory device 306, each time memory system 302 is powered up or reset, that can cause memory device 306 to determine whether the user data in partition 317 is secure.

Memory device 306 can determine whether the user data is secure by determining whether the user data has changed (e.g., since memory device 306 was last powered down). This can be accomplished by calculating a cryptographic measure for the user data in secure partition 317 and comparing the cryptographic measure to golden measure 334.

In some examples, the cryptographic measure can be an HMAC of all the user data in partition 317. The HMAC can be similar to the HMAC described previously in conjunction with the local signature (e.g., HMAC(user data, K)). For example, the cryptographic measure can be the local signature HASH computed by HMAC component 352 in conjunction with SHA component 354 with the user data being the payload.

The secure command can be authenticated by controller 345, as described previously. Controller 345 can execute the authenticated command to determine the cryptographic measure for partition 317. Controller 345 can activate read/write circuitry 335 to read the data structures 325'-1 to 325'-M one by one from partition 317 into buffer 311. Controller 345 can activate, via control signals, buffer 311, data path 312, data selector 337, and ECC component 310. ECC component 310 can correct the respective user data in each of the data structures 325'-1 to 325'-M with the respective ECC data calculated by ECC component 310. ECC component 310 can send the corrected user data to cryptographic component 314, and cryptographic component 314 can calculate the cryptographic measure of the corrected user data.

Controller 345 can send a control signal to multiplexer 339 that can cause multiplexer 339 select the input coupled to ECC component 310 so that ECC component 310 can send the corrected user data to demultiplexer 350. In some examples, controller 345 can activate control logic 356, via a "handshake" operation, and control logic 356 can send a signal to demultiplexer 350 that causes demultiplexer 350 to pass the corrected user data to HMAC component 352. HMAC component 352 (e.g., in conjunction with SHA component 354) can then calculate the cryptographic measure from the corrected user data.

The cryptographic measure can be compared to golden measure 334. If the cryptographic measure is equal to the golden measure 334, the user data in partition is unchanged, and thus secure. However, if the cryptographic measure is not equal to the golden measure 334, the user data in partition has been changed (e.g., due to a hacker attack), and is thus deemed not secure.

For examples in which each of the respective data structures 325'-1 to 325'-M is configured as data structure 225'. The respective frames, Frame 1 to Frame 4, can be sent to data selector 337 from buffer 311 so that data selector 337 can select the respective user data USER1 to USER4 and the respective ECC data ECC'1 to ECC'4 and send USER1 to USER4 and the respective ECC data ECC'1 to ECC'4 to ECC component 310. ECC component 310 can correct the respective user data USER1 to USER4 with the respective ECC'1 to ECC'4 and send the corrected user data USER1 to USER4 to cryptographic component 314. This process can be repeated each of the respective data structures 325'-1 to 325'-M.

In some examples, golden measure 334 can be calculated as described previously for the cryptographic measure, but for the initial state of the user data (e.g., the initial user data) in partition 317 when the user data is first stored in the secure partition 317 and no operations, such as read, write, or erase operations, have been performed on partition 317. For example, golden measure 334 can be an HMAC. The HMAC can be similar to the HMAC described previously in conjunction with the local signature (e.g., HMAC(initial user data, K)). For example, golden measure 334 can be the local signature HASH computed by HMAC component 352 in conjunction with SHA component 354 with the initial user data being the payload.

When the errors in the user data in a frame of a data structure cannot be corrected by ECC component 310, internal controller 345 can cause read/write circuitry 335 to re-read the data structure, for example, so ECC component 310 can correct the user data in each frame of the re-read data structure.

In some examples, controller 304 can read the data structure in buffer 311 in response to ECC component 310 not being able to correct the user data in a frame of the data structure. For example, ECC component 308 can correct the data in the respective frames of the data structure, such as USER1, USER2, USER3, and USER 4, with the corresponding ECC data calculated by ECC component 308, such as ECC1, ECC2, ECC3, and ECC4. Controller 304 can then send the data structure with the corrected user data (e.g., externally corrected user data) to data buffer 311. Controller 345 can then cause the data selector 337 to select the externally corrected user data. Controller 345 can, in some examples, place ECC component 310 in a bypass mode so that data selector 337 can select the externally corrected user data to cryptographic component 314 without correction by ECC component 310. This can be done during the calculation of the cryptographic measure, for example.

In some examples, controller 304 might be used to correct the data in partition 317 only when any of the data in partition 317 has changed. Alternatively, a remediation procedure can be used when any of the data in partition 317 has changed. The data in partition 317 can be changed as a result of a hacker attack or a technical failure in the operation of memory device 306. The remediation procedure can also be performed in response to the cryptographic measure not matching golden measure 344. The remediation procedure can involve controller 345 replacing partition 317 with partition 317', for example.

In the various preceding examples involving secret key 333, secret key 333 was used directly. However, in some examples, session keys can be used in place of secret key 333. For example, a new (e.g., different) session key can be used during each power cycle of memory system 302 that can start at each power-up (e.g., reset) of memory system 302. A session key can be calculated, for example, for a power cycle at the end of the preceding power cycle by cryptographic component 314. For example, the session key can be the MAC of secret key 333 and the MTC at the end of the preceding power cycle (e.g., session key=MAC(MTC, secret key)). Alternatively, session key=HMAC(MTC, secret key), for example.

Memory device 306 can have a memory-device identifier (ID). In some examples, in response to a memory device authentication command from controller 304, controller 345 can send the ID to cryptographic component 314. Cryptographic component 314 can calculate a cryptographic code (e.g., a signature ID) as a MAC of secret key 333 and the ID (e.g., signature ID=MAC(secret key, ID). Cryptographic component 314 can return the signature ID to controller 345, and controller 345 can send the signature ID to controller 304. Controller 304 can compare to signature ID to a correct signature ID for memory device 306 and can determine from the comparison if memory device is authentic. If the signature IDs match memory device 306 is authentic. Otherwise, memory device 306 is not authentic and, for example, could be a clone.

Figure 5:
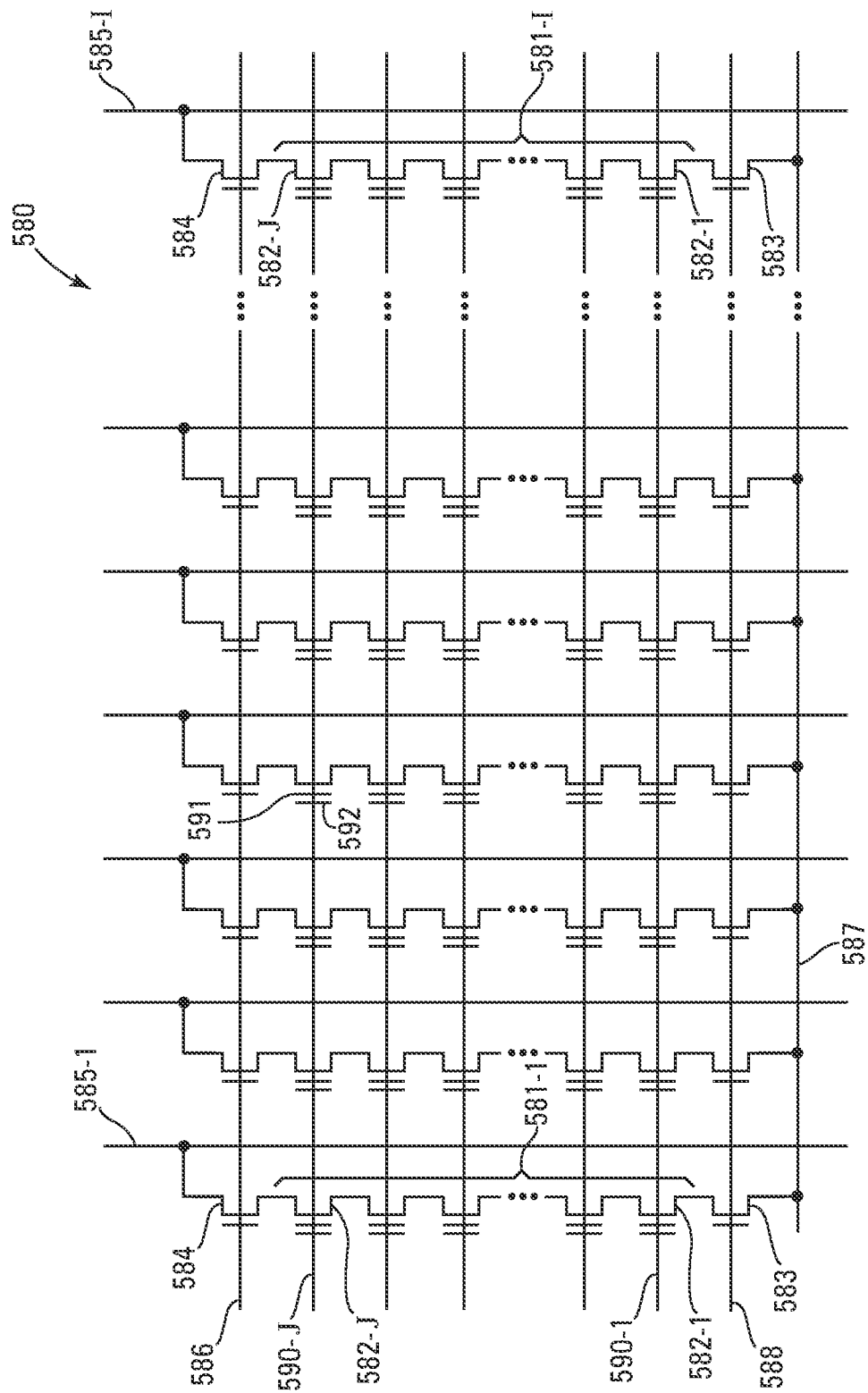
FIG. 5 is a schematic diagram of a portion of a memory array in accordance with a number of embodiments of the disclosure.

FIG. 5 is a schematic diagram of a block 580 (e.g., a NAND block) of non-volatile memory cells that can be a portion of array 109 of 309 (e.g., a NAND array). In some examples, block 580 can correspond to a non-secure partition 116 or 316 or a secure partition 117 or 317.

Block 580 includes groups (e.g., NAND strings 581-1 to 581-I) of series-coupled memory cells. Each of NAND strings 581-1 to 581-I can include memory cells 582-1 to 582-J coupled in series between a select transistor 583 and a select transistor 584. NAND strings 581-1 to 5814 can be respectively selectively coupled to data lines 585-1 to 5854 (e.g., bit lines) by the respective select transistors 584 in response to an activation signal being applied to a select line 586 commonly coupled to the gates of select transistors 584. NAND strings 581-1 to 581-I can be selectively coupled to a common source 587 by the respective select transistors 583 in response to an activation signal being applied to a select line 588 commonly coupled to the gates of select transistors 583.

Access lines 590-1 to 590-J (e.g., word lines) can be respectively commonly coupled to the control gates of memory cells 582-1 to 582-J. For example, a group of memory cells 582 at a common location in NAND strings 581-1 to 581-N can be commonly coupled to a respective access line 590. In some examples, a group of memory cells commonly coupled to an access line can be a page of memory cells. For example, the respective groups of I memory cells respectively commonly coupled to access lines 590-1 to 590-J can be respective pages of memory cells. As such, there can be J pages of memory cells in block 580, each having I memory cells. However, the present disclosure is not so limited, and various groupings of memory cells commonly coupled to an access line can correspond to a page. In some examples a data structure, such as data structure 225, 225', or 325', can be stored the pages.

Note that all of the memory cells 582 of block 580 can be commonly erased during an erase process, regardless of whether block 580 is part of a secure of non-secure partition. When block 580 is part of a secure partition, block 580 can be erased in response to a secure erase command, received from controller 304, that can be authenticated as described previously. When block 580 is part of a non-secure partition, block 580 can be erased in response to a non-secure erase received from controller 304. In some examples, the memory cells 582 can be written or read a page at time.

Each of the memory cells 582 can include a charge storage structure 591, such as a floating gate or a charge trapping layer, among others, and a control gate 592. Changes in Vts of memory cells 358 through programming of charge storage structures 378 can determine the data state of each cell.

Memory cells 582 can be SLCs that can store a single bit per cell or MLCs multiple bits per cell such as, two bits per cell, three bits per cell, such as three-level cells (TLCs), four bits per cell, such as quad-level cells (QLCs), and so on. Note that partitions 117 and 317 can include blocks of SLCs only, whereas partitions 116 or 316 can include blocks of SLCs and/or MLCs.

In some examples, block 580 can be a portion of a stacked memory array that can be referred to as a three-dimensional (3D) memory array, such as a three-dimensional NAND memory array. In a stacked memory array, NAND strings 581 can be adjacent to semiconductor structures (e.g., vertical semiconductor pillars), and the memory cells 582 in NAND strings 581 can be at different levels (e.g., vertical levels). The memory cells 582 commonly coupled to an access line 590, such as a page of memory cells, can be at a common level, for example, and may form a level of memory cells, sometimes referred to as a tier of memory cells.

In the preceding detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" or a "quantity of" something can refer to one or more of such things. For example, a number of or a quantity of memory cells can refer to one or more memory cells. A "plurality" of something intends two or more. As used herein, the term "coupled" may include electrically coupled, directly coupled, and/or directly connected with no intervening elements (e.g., by direct physical contact), indirectly coupled and/or connected with intervening elements, or wirelessly coupled. The term coupled may further include two or more elements that co-operate or interact with each other (e.g., as in a cause and effect relationship).

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment.

Thus, the following claims are hereby incorporated into the Detailed Description, with each claim standing on its own as a separate embodiment.

What is claimed is:

1. An apparatus, comprising:
 a first controller comprising a first error correction code component; and
 a memory device coupled to the first controller, the memory device comprising:
  an array of memory cells;
  a second error correction code component coupled to the array and configured to correct data read from the array;
  a cryptographic component configured to receive, from the second error correction code component, the corrected data read from the array; and
  a command interface coupled to a second controller and configured to activate the second controller in response to receiving a command from the first controller.

2. The apparatus of claim 1, wherein the second controller is configured to provide control signals to the cryptographic component and to the second error correction code component.

3. The apparatus of claim 1, wherein the array is a NAND flash array.

4. The apparatus of claim 1, wherein the second error correction code component is a light error correction code component in comparison to the first error correction code component.

5. The apparatus of claim 1, wherein:
 the first error correction code component is configured to correct the data read from the array using a first error correction code; and
 the second error correction code component is configured to correct the data read from the array using a second error correction code.

6. The apparatus of claim 5, wherein:
 the first error correction code component is configured to calculate the first error correction code; and
 the second error correction code component is configured to calculate the second error correction code.

7. The apparatus of claim 1, wherein:
 the cryptographic component is configured to calculate a first cryptographic code from the received data; and
 the memory device is configured to compare the first cryptographic code to a second cryptographic code stored in the array.

8. The apparatus of claim 7, wherein the first and second cryptographic codes are based on a secret key stored in the array.

9. The apparatus of claim 8, wherein the first and second cryptographic codes are first and second cryptographic hashes.

10. The apparatus of claim 1, wherein the first controller is external to the memory device and is coupled to the memory device via a memory interface and to a host via a host interface.

11. The apparatus of claim 1, wherein the memory device comprises a monotonic counter coupled to the second controller.

12. The apparatus of claim 11, wherein the second controller is configured to compare a monotonic count from the monotonic counter to a monotonic count in a command received from the first controller to determine a freshness of the command.

13. The apparatus of claim 1, wherein the memory device comprises a physical unclonable function component coupled to the second controller.

14. A memory device, comprising:
 an array of memory cells comprising a secure partition;
 a buffer coupled to the array;
 an error correction code component coupled to the buffer;
 a first controller configured to write a data structure from the buffer to the secure partition, wherein the data structure comprises a plurality of segments of data;
 a cryptographic component coupled to the error correction code component; and
 a command interface coupled to the first controller and configured to activate the first controller in response to receiving a command from a second controller that is external to the memory device.

15. The memory device of claim 14, wherein the plurality of segments of data comprise respective user data and corresponding first error correction code data calculated by the second controller.

16. The memory device of claim 15, wherein the error correction component is configured to:
 receive the plurality of segments of data from the buffer;
 calculate respective second error correction code data corresponding to the respective segments of data; and
 add the respective second error correction code data to the respective segments of data.

17. The memory device of claim 16, wherein the error correction component is configured to:
 correct the user data of the respective segments of data using the respective second error correction code data; and
 send the corrected respective user data to the cryptographic component.

18. The memory device of claim 14, wherein the first controller is configured to, in response to being activated:
 determine a freshness of the command;
 cause the cryptographic component to calculate a signature in response to determining that the command is fresh; and
 compare the calculated signature to a signature in the command.

19. A method, comprising:
 reading data from a first logical partition of a memory array of a memory device, the data comprising:
  user data;
  first error correction data corresponding to the user data and calculated by an external controller from the user data; and
  second error correction data calculated by an error correction code component of the memory device from the user data;
 correcting the user data with the second error correction data;
 sending the corrected user data from the error correction code component to a cryptographic component of the memory device;
 calculating, via the cryptographic component, a cryptographic measure from the corrected data;
 comparing the calculated cryptographic measure to a golden measure stored in the memory array; and
 in response to the calculated cryptographic measure not matching the golden measure, replacing the first logical partition with a second logical partition.

20. The method of claim 19, further comprising, prior to correcting the user data with the second error correction data:

sending the data from memory array to a data selector of the memory device;
selecting the user data and the second error correction data from the data; and
sending the user data and the second error correction data from the data selector to the error correction code component.

* * * * *